April 19, 1938.  F. C. JEARUM  2,114,384
ADJUSTABLE BORING BAR
Filed Sept. 30, 1936
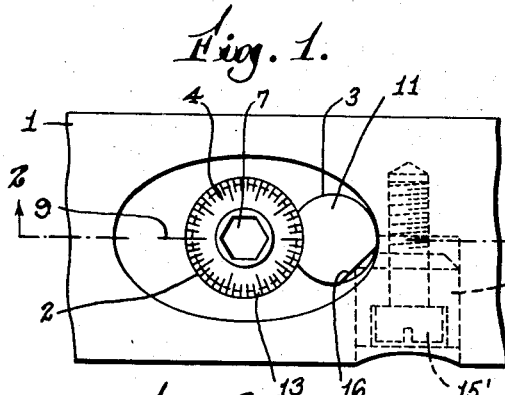
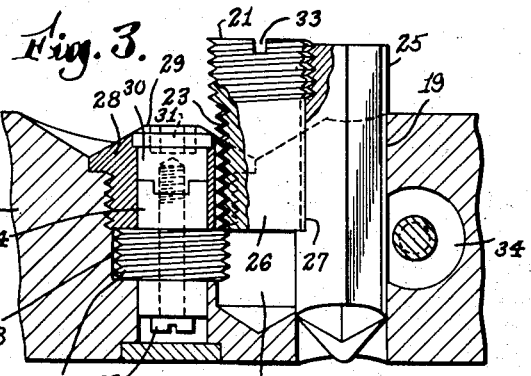
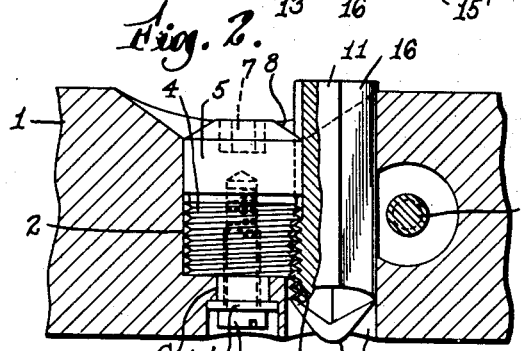
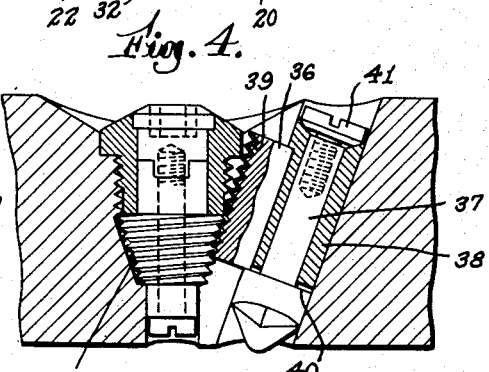
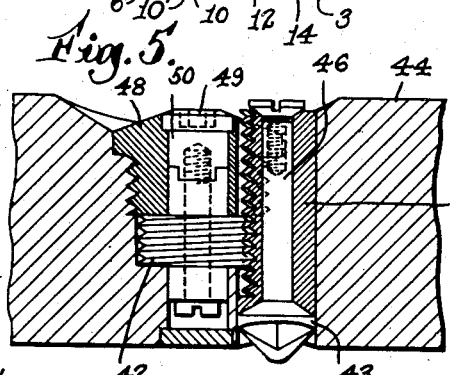
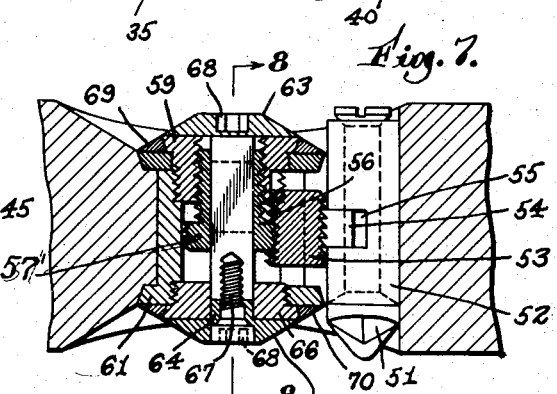
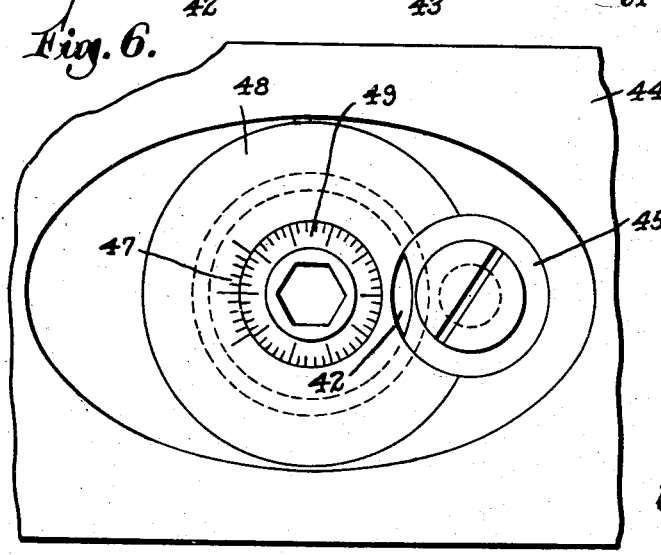
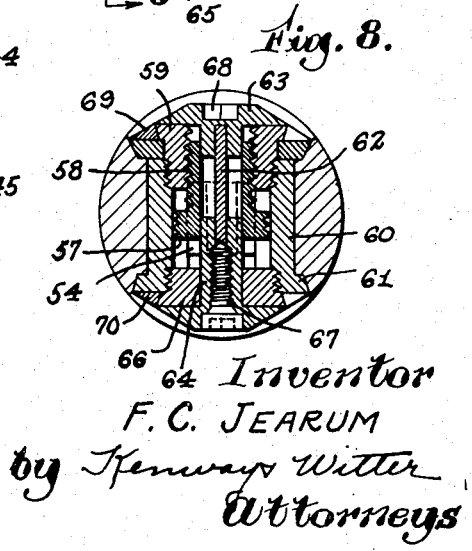
Inventor
F. C. JEARUM
by Kenways Witter
Attorneys

UNITED STATES PATENT OFFICE 2,114,384

ADJUSTABLE BORING BAR

Frederick Charles Jearum, Chipstead, England

Application September 30, 1936, Serial No. 103,446
In Great Britain January 13, 1936

10 Claims. (Cl. 77—58)

This invention relates to adjustable boring bars or, more particularly, boring bars having cutting bits adjustable therein. In the ordinary use of cutting bits clamped in boring bars such as are employed in finishing internal bores of various kinds, it is customary to effect such radial adjustments of the bit in the bar as may be necessary, for obtaining the correct diameter of the bore, by tapping the bit in or out of the bar until the required setting is achieved. This procedure, while crude, is sufficiently satisfactory for many classes of work where the bit is a mere piece of hardened tool stock ground to shape but, where extreme accuracy of the work demands the use of higher types of bits, or those furnished with super-hard tips, such as of tungsten carbide or diamond, the practice of setting the bit by tapping, in addition to being erratic in result, endangers the tip to a serious extent and frequently results in its becoming unserviceable before its proper duty has commenced.

The present invention is directed to the provision of a boring bar having rotatable threaded means for adjusting a removable cutter bit with respect to the said bar, graduated means for indicating the extent of the said adjustment and means for retaining the parts in operative relation. It is also an object of the invention to provide the aforementioned control of the cutter bit through such means as will admit of the ready removal and replacement of the bit without disturbing the adjustment.

The invention may be carried into effect in various ways, some of which will now be described with reference to the accompanying drawing in which, Fig. 1 is a fragmentary elevation of a boring bar embodying my invention and showing the cutting bit and its adjusting means in end elevation, Fig. 2 is a sectional view taken on line 2—2 of Fig. 1, Figs. 3, 4 and 5 are views like Fig. 2 and respectively showing three modified forms of the invention, Fig. 6 is a top end elevation of the cutting bit and its adjusting means shown in Fig. 5, Fig. 7 is a view like Fig. 2 but showing the device as employing a differential threaded adjustment for the cutting bit, and Fig. 8 is a view taken on line 8—8 of Fig. 7.

In Figs. 1 and 2, the boring bar 1 is formed with a transverse bore 2 somewhat intersected by a second transverse bore 3. In the bore 2 is mounted a screw threaded member 4, having a plain upper portion 5 fitting in the bore and a spigot or trunnion 6 fitting a hole through the bottom of the bore 2, the bore 2 having a bottom wall surrounding this hole. The member 4 is provided with an hexagonal hole 7 in its outer end and with a chamfered face 8 graduated as shown, the graduations 13 riding against an index mark 9 in a counter-sink at the outer end of the bore 2. A washer 10' on a screw 10 retains the member 4 in constant contact with the said bottom wall while still permitting rotation of the member 4.

In this case, the cutter bit 11 which is slidable in the bore 3 is provided with a segment of internal thread 12 formed in its side adjacent to the bore 2 when the bit is positioned in the bore 3. This thread 12 engages with the threads of the member 4 so that when the member 4 is rotated by a key inserted in the hexagonal hole 7, the bit 11 is moved transversely of the bar 1 to vary the radial position of the cutting bit 14. A clamping pad 15 is formed with a chamfer to coact with a corresponding flat 16 on the cutter bit 11 at such an angle as to direct the clamping pressure onto the wall of the bore 3 in a manner avoiding undesirable reactions on the member 4. The pad 15 is drawn into clamping position by a screw 15' threaded into the bar.

In Fig. 3 is shown a modification of the invention designed to simplify somewhat the preparation of the cutter bit for use in the bar. Here the bar 17 has two transverse bores 18 and 19 and a pocket 20 disposed between such bores, the bore 19 and pocket 20 being in effect a single bore and somewhat intersecting the bore 18.

The pocket 20 contains a sliding plunger 21 formed in its side adjacent to the bore 18 with a segment 23 of screw thread adapted to coact with the threaded portion 22 of a stem 24 in the bore 18. The plunger 21 is also formed with external threads at its upper end on an enlarged part of its periphery to engage with a short segment of thread formed in the side of the cutter bit 25, its plain portion 26 resting in the flute 27 formed in the side of the bit 25. The stem 24 is centered above the portion 22 in a flanged sleeve 28 threaded in the upper portion of the bore 18, the flange of the sleeve 28 being recessed in its outer face to accommodate the smaller flange 29 of a short stem 30 keyed, as shown, to the outer end of the stem 24.

The stem 30 is formed with a hexagonal hole 31 for receiving a rotating key, and a screw 32 is passed upwardly through an axial hole in the stem 24 and threaded into the stem 30 to clamp the two together and thus maintain them in constant relation with one another and axially positioned by the sleeve 28.

In the position in which the parts are shown, the plunger 21 has just been partly inserted into its pocket 20 and has been rotated by means of the screwdriver slot 33 sufficiently to engage its upper screwed portion with the corresponding preparation in the bit 25, its plain portion 26 being accommodated in the flute 27 of the bit 25. The rotation of the plunger 21 to complete its insertion brings its screwed segment 23 into engagement with the screw 22 and, if the bit 25 be pressed so as further to enter the hole 19, a rotation of the screw 22 by the stem 30 will cause the segment 23 to become engaged with the screw 22 and to place the bit 25 under its control radially of the bar 17. A clamp 34 is provided in this and the other forms of the invention as in the case of the bar 1 in Figs. 1 and 2.

In place of its upper screwed portion, the plunger 21 may be secured to the bit 25 as shown in Fig. 4 where, also, when the member 35 is tapered, the plunger 36 and the bit 37 may be correspondingly inclined. Here the bit 37 is surrounded by a sleeve 38 with a stopped flat on one side and the plunger 36 has a similar flat on its side remote from its screwed segment 39 by which it engages with the member 35. The plunger 36 is thus secured endwise by being clamped between the shoulder 40 of the bit 37 and the end of the flat on the sleeve 38 when the screw 41 is screwed home in the shank of the bit 37. The remaining parts relating to the operation and retention of the member 35 are substantially as shown in Fig. 3.

In Figs. 5 and 6 the sleeve surrounding the bit is retained as in Fig. 4 but the plunger is dispensed with, the screwed segment being formed on the sleeve itself. In these figures the member 42 is shown parallel with the bit 43, and consequently normal to the axis of the bar 44. The sleeve 45 contains the shank 46 of the bit 43 and it may be mentioned here that constructions such as this, which admit of the bit being rotated on its axis are of importance from the facility with which side rake may be given to the cutting edge. Obviously the member 42 may be made tapered and the sleeve 45 containing the bit be set at an angle as in the construction shown in Fig. 4.

A vernier 47 is provided on the rim of the flanged sleeve 48 and the flange 49 of the stem 50 is graduated into fifty units. With this arrangement, if the threads on the member 42 are twenty to the inch, the adjustment of the bit may be read to 1/10,000 of an inch. A similar graduation, in the cases in which a tapering member and inclined bit are employed, is effective if the thread pitch is twenty to the inch, measured normally to the axis of the bar, the thread of the plunger, sleeve or bit, as the case may be, being of corresponding pitch.

Figs. 7 and 8 show a modified construction in which the cutter bit 51 is retained in a sleeve 52 as before, but the sleeve 52 is locked to an intermediate plunger 53 having a serrated side, by means of a saddle piece 54 housed in a gap in the wall of the sleeve 52. This saddle piece is serrated to match the plunger 53 and is held in engagement with the plunger by the shank of the bit 51. On the withdrawal of the bit 51 for any reason, the saddle piece 54 is free to float away from the plunger 53, a sufficient clearance 55 being allowed in the gap in the sleeve 52 in which it is housed. This provision allows the ready axial displacement or withdrawal of the sleeve 52 whenever the bit 51 is removed from it.

The plunger 53 is provided with a threaded segment 56 as in previous cases, whereby it engages with the threads 57 of a member 57' which has a second threaded portion 58 of a pitch different from that of the segment 56. The portion 58 is threaded into the sleeve 59 which is screwed into the longer sleeve 60 having a flange 61 at its lower end. The member 57' has a hole axially therein which is closed by a wall at its upper end having a transverse slot through which passes a blade 62 depending from and attached to a flange 63 resting on the upper face of the sleeve 59. The lower end of the blade 62 is inserted into a fitting slot in the upper end of the stem 64 of a lower flange 65 which rests against a threaded diaphragm 66 inserted into the lower end of the sleeve 60. The blade 62 is retained in engagement with the stem 64 by an axial screw 67 tapped into the two members 62 and 64 jointly, thus maintaining the two flanges 63 and 65, at a constant distance apart, in contact with their respective locating members, 59 and 66 and also rotationally interlocked. By this construction the member 57' is caused to move up or down the blade 62 as it is rotated together with the flanges 63 and 65 each of which is provided with an hexagonal hole 68 for operation as in the case of the former constructions. Also, the two screw threads on the member 57' being of different pitch but of the same hand, the plunger 53 will travel porportionately to the difference of the two thread-pitches which can be made much smaller than would be serviceable as a single thread-pitch. A further convenience is represented by the loose dials shown at 69 and 70 which provide a movable zero in well known manner.

It will now be seen that the invention may be carried into effect in a variety of constructions some of which are indicated in the representative cases herein described and illustrated, it being understood that the invention includes other embodiments within the scope of the claims appended hereto.

What I claim is:—

1. A tool of the class described, comprising a boring bar having a bore extending transversely therein, a shank mounted for axial movement in said bore, a super-hard tipped bit at one end of the shank, screw threaded means journalled for rotation in another bore in the bar adjacent to the shank and in such position that a line drawn across the crests of the threads longitudinally of said means and in opposed relation to the shank is parallel with the longitudinal axis of the shank, shoulders integral with the bar, means coaxial of and carried by the screw threaded means and engaging said shoulders for preventing axial bodily movement of the screw threaded means relative to the bar, means including a segmental concave surface formed with screw threads in direct engagement with the first-named threads, fixed against movement relatively and longitudinally of the shank and providing an operative connection between the first-named threads and the shank whereby rotation of the screw threaded means will move the shank longitudinally, and clamping means in the bar having a portion for engaging the shank with a clamping pressure at a point diametrically opposite to a wall of the first-named bore.

2. The tool defined in claim 1 wherein the longitudinal axis of said clamping means is disposed laterally of the first-named bore.

3. The tool defined in claim 1 wherein said concave surface is formed on an element in direct contact with and secured against movement longitudinally of said shank.

4. The tool defined in claim 1 wherein said concave surface is formed on a sleeve fixed against longitudinal movement on said shank.

5. The tool defined in claim 1 wherein said concave surface is formed directly on said shank.

6. A tool of the class described, comprising a boring bar having a bore extending transversely therein, a shank mounted for axial movement in said bore, a super-hard tipped bit at one end of the shank, the bar having a second transverse bore therein open to the first-named bore, a screw threaded element in the second bore in engagement with a bottom wall thereof, means preventing axial movement of the element away from said wall, means, including a segmental concave surface having screw threads in direct engagement with the threads of said element and fixed against movement relatively and longitudinally of the shank and providing an operative connection between the threads of said element and the shank whereby rotation of the element will move the shank longitudinally, and clamping means for securing the shank to the bar.

7. The tool defined in claim 6 wherein said screw threaded element has a reduced portion projecting beyond said bottom wall and wherein the first-named means is carried by said projecting portion.

8. A tool of the class described, comprising a boring bar having a bore extending transversely therein, a shank mounted for axial movement in said bore, a super-hard tipped bit at one end of the shank, the bar having a second transverse bore therein open to the first-named bore and having an annular bottom wall with a bore of reduced diameter therethrough, a screw threaded element in the second bore having flat annular end surfaces with two trunnions projecting in opposite directions respectively therefrom, the inner trunnion fitting within said reduced bore and the adjacent annular end surface engaging against said annular bottom wall, supporting means carried by the bar and fitting over the outer trunnion and against the adjacent annular end surface of said element, means, including a segmental concave surface formed with screw threads in direct engagement with the threads of said element and fixed against movement relatively and longitudinally of the shank and providing an operative connection between the threads of said element and the shank whereby rotation of the element will move the shank longitudinally, and clamping means for securing the shank to the bar.

9. A tool of the class described, comprising a boring bar having a bore extending transversely therein, a shank mounted for axial movement in said bore, a super-hard tipped bit at one end of the shank, screw threaded means journalled for rotation in another bore in the bar adjacent to the shank and in such position that a line drawn across the crests of the threads longitudinally of said means and in opposed relation to the shank is parallel with the longitudinal axis of the shank, means coaxial of the screw threaded means for limiting axial movement of the screw threaded means relative to the bar, means, including a segmental concave surface formed with screw threads in direct engagement with the first-named threads, fixed against movement relatively and longitudinally of the shank and providing an operative connection between the first-named threads and the shank whereby rotation of the screw threaded means will move the shank longitudinally, and clamping means in the bar having a portion for engaging the shank with a clamping pressure at a point diametrically opposite to a wall of the first-named bore.

10. The tool defined in claim 9 wherein said screw threaded means is provided with a second set of screw threads of different pitch but in the same direction as the first-named threads thereon, whereby rotation of the screw threaded means moves the shank longitudinally an amount proportional to the difference of pitch in said first and second named screw threads on said screw threaded means.

FREDERICK CHARLES JEARUM.